US012261352B2

(12) United States Patent
Diem et al.

(10) Patent No.: US 12,261,352 B2
(45) Date of Patent: Mar. 25, 2025

(54) GNSS ANTENNA SYSTEM FOR RECEIVING MULTI-BAND GNSS SIGNALS

(71) Applicants: HEXAGON GEOSYSTEMS SERVICES AG, Heerbrugg (CH); LEICA GEOSYSTEMS AG, Heerbrugg (CH)

(72) Inventors: Fabio Diem, Zürich (CH); Garance Bruneau, Zürich (CH); Pascal Gohl, Winterthur (CH); Tuomo Haarakangas, Oulu (FI); Ilkka Heikura, Oulunsalo (FI)

(73) Assignees: HEXAGON GEOSYSTEMS SERVICES AG, Heerbrugg (CH); LEICA GEOSYSTEMS AG, Heerbrugg (CH)

( * ) Notice: Subject to any disclaimer, the term of this patent is extended or adjusted under 35 U.S.C. 154(b) by 125 days.

(21) Appl. No.: 17/902,547

(22) Filed: Sep. 2, 2022

(65) Prior Publication Data

US 2023/0072603 A1 Mar. 9, 2023

(30) Foreign Application Priority Data

Sep. 3, 2021 (EP) .................................... 21194841

(51) Int. Cl.

| | |
|---|---|
| ***H01Q 1/27*** | (2006.01) |
| ***H01Q 1/24*** | (2006.01) |
| ***H01Q 9/04*** | (2006.01) |

(52) U.S. Cl.

CPC ............... *H01Q 1/27* (2013.01); *H01Q 1/246* (2013.01); *H01Q 9/0414* (2013.01)

(58) Field of Classification Search

CPC ........ H01Q 1/27; H01Q 1/246; H01Q 9/0414; H01Q 1/286; H01Q 5/42; H01Q 9/42; H01Q 21/24

See application file for complete search history.

(56) References Cited

U.S. PATENT DOCUMENTS

| | | | | |
|---|---|---|---|---|
| 9,356,349 B2 * | 5/2016 | Park | ........................ | H01Q 21/26 |
| 11,024,980 B2 * | 6/2021 | Vollmer | ................. | H01Q 1/246 |
| 2022/0368032 A1 * | 11/2022 | Kaufmann | ............... | H01Q 1/24 |
| 2023/0066694 A1 * | 3/2023 | Kowaita | ................. | B60R 11/02 |

FOREIGN PATENT DOCUMENTS

| | | |
|---|---|---|
| EP | 0757405 A1 | 2/1997 |
| EP | 3764123 A1 | 1/2021 |
| WO | 2016077391 A2 | 5/2016 |
| WO | 2016077391 A3 | 8/2016 |

OTHER PUBLICATIONS

European Search Report dated May 11, 2022 as received in application No. 21194841.9.

Rudant et al., "New Approach in Antenna Design Automation Applied to a Dual-Band GNSS Micro-Array" Mar. 22, 2021.

* cited by examiner

*Primary Examiner* — Seung H Lee

(74) *Attorney, Agent, or Firm* — Maschoff Brennan

(57) ABSTRACT

A GNSS antenna system for receiving GNSS signals in the L1 and L2/L5 frequency band, and to an unmanned aerial vehicle (UAV) comprising the GNSS antenna system.

18 Claims, 3 Drawing Sheets

GNSS ANTENNA SYSTEM FOR RECEIVING MULTI-BAND GNSS SIGNALS

BACKGROUND

The present disclosure relates to a system according to the preambles of the independent claims.

Global navigation satellite systems (GNSS) such as the Global Positioning System (GPS), the Global Navigation Satellite System (GLONASS), the BeiDou Navigation Satellite System (BDS) or Galileo are of paramount importance for modern navigation systems. Such GNSS navigation systems are e.g. used ubiquitously in cars or unmanned aerial vehicles (UAV) such as drones. For such purposes, off-the-shelf GPS receivers and GPS antennas are available.

Inverted F-antennas are known in state-of-the-art antenna design and are used extensively for wireless communication. Inverted F-antennas embodied as planar inverted F-antennas (PIFA) are particularly useful as such PIFA antennas can be compactly realized on printed circuit boards. Inverted F-antennas as used in the state of the art typically comprise straight antennas with equal distance from monopole antenna of the inverted F-antenna to ground plane of the inverted F-antenna along the entire antenna. Non-straight, i.e. bent antennas, are typically not used in state-of-the-art inverted F-antennas as such bent antennas show worse radiation behavior as compared to straight antennas.

GNSS systems typically transmit navigation information in at least two frequency bands. Commonly used frequency bands are known as L1 (1559-1606 MHz), L2 (1197-1249 MHz) or L5 which occupies a similar frequency band as L2. As GNSS satellites typically emit right hand circular polarization (RHCP) signals, antennas used for receiving GNSS signals are preferentially RHCP antennas in state-of-the-art GNSS systems.

SUMMARY

It is therefore an object to provide a GNSS system with inverted F-antennas for receiving GNSS signals in the L1 and L2/L5 frequency band.

A further object is to provide a GNSS system with inverted F-antennas, wherein at least some of the antennas of the inverted F-antennas are bent antennas.

A further object is to provide a GNSS system with inverted F-antennas optimized for receiving RHCP GNSS signals.

It is also an object to provide an unmanned aerial vehicle (UAV) with a GNSS system which is tightly integrated into the UAV.

These objects are achieved by realizing the characterizing features of the independent claims. Features which further develop an alternative or advantageous manner are described in the dependent patent claims.

The disclosure relates to a GNSS antenna system for receiving GNSS signals, in particular GPS, GLONASS, BDS or Galileo, comprising 1) at least one inverted F-antenna configured to receive GNSS signals in the L1 frequency band (L1-antenna), and 2) at least one inverted F-antenna configured to receive GNSS signals in the L2/L5 frequency band (L2/L5-antenna). Each inverted F-antenna comprises an antenna having an antenna end point and a grounded end, a ground plane and a feed, wherein the feed is connected at an intermediate point to the antenna and wherein the antenna is connected at the grounded end to the ground plane, each inverted F-antenna having a direction defined between the grounded end and the antenna end point. The GNSS antenna system comprises four L1-antennas and four L2/L5-antennas, wherein 1) a first L1-antenna of the four L1-antennas is oriented in a first direction, 2) a second L1-antenna of the four L1-antennas is oriented in a second direction substantially orthogonal to the first direction, 3) a third L1-antenna of the four L1-antennas is oriented in a third direction substantially orthogonal to the second direction and substantially antiparallel to the first direction, and 4) a fourth antenna of the four L1-antennas is oriented in a fourth direction substantially orthogonal to the third direction and substantially antiparallel to the second direction. Each L2/L5-antenna of the four L2/L5-antennas has a corresponding L1-antenna and the direction of each L2/L5-antenna substantially corresponds to the direction of the corresponding L1-antenna.

The GNSS antenna system therefore comprises four inverted F-antennas for receiving GNSS signals in the L1 frequency band and four inverted F-antennas for receiving GNSS signals in the L2/L5 frequency band. Each L1-antenna has a corresponding L2/L5-antenna which is oriented in substantially the same manner as the L1-antenna to which it corresponds. Alternatively, the L2/L5 antenna may be oriented in the opposite direction as compared to the L1-antenna to which it corresponds. The antennas of the eight inverted F-antennas of the GNSS antenna system are therefore substantially oriented in four directions (opposite directions are here not counted separately).

The term substantially, or said differently roughly, orthogonal may be understood to include deviations from strict orthogonality. Deviations by up to 30 degrees from orthogonality are assumed to be included in the term substantially orthogonal. Angles between directions may be evaluated using an inner product, also termed dot product. Substantial correspondence of directions between an L1-antenna and a corresponding L2/L5-antenna may also be understood to refer to deviations from parallelism/anti-parallelism by up to 30 degrees. An antenna of an L1-antenna and an antenna of a corresponding L2/L5-antenna therefore roughly “point in the same direction”.

The GNSS antenna system comprises eight driven elements, the driven elements corresponding to the antennas of the inverted F-antennas connected to feed lines. The four L1-antennas each have resonance frequencies tailored to receiving GNSS signals in the L1 frequency band, and the four L2/L5-antennas each have resonance frequencies tailored to receiving GNSS signals in the L2/L5 frequency band.

In an embodiment of the GNSS antenna system, at least one of the four L1-antennas and/or at least one of the four L2/L5-antennas comprises an antenna which is bent.

Having bent antennas may be used for providing a compact GNSS antenna system. Within a volume, a bent antenna may have a greater length than a straight antenna within the same volume. Antenna length is important for frequency selectivity, i.e. different antenna lengths influence which frequencies the antenna receives well as resonance frequency typically changes by varying antenna length. The antennas of the four inverted F-antennas for receiving GNSS signals in the L2/L5 frequency band are typically longer than the antennas for receiving GNSS signals in the L1 frequency band as the L1 frequency band comprises higher frequencies than the L2/L5 frequency band, higher frequencies translating to shorter wavelengths and therefore to shorter antennas.

In a further embodiment of the GNSS antenna system, the four L1-antennas and the four L2/L5-antennas share a common ground plane.

Having one common ground plane for the eight inverted F-antennas of the GNSS antenna system may be used for providing a compact GNSS antenna system. All eight antennas are shorted at their respective grounded ends to the same common ground plane.

In a further embodiment of the GNSS antenna system, the antennas of the four L1-antennas are configured to be fed by a first quadrifilar 4-phased antenna feeder (L1-feeder) using the respective feed, and the antennas of the four L2/L5-antennas are configured to be fed by a second quadrifilar 4-phased antenna feeder (L2/L5-feeder) using the respective feed, wherein a phase of a feed signal provided by the respective feed differs by 90 degrees between consecutive L1-antennas and by 90 degrees between consecutive L2/L5-antennas.

Both the first quadrifilar 4-phased antenna feeder and the second quadrifilar 4-phased antenna feeder provide quadrature phasing. Quadrature phasing results in a rotating radiated field, which radiated field may be circularly polarized; a circularly polarized radiated field is typically—e.g. due to imperfections of antennas—not fully circular, but may also comprise a linearly polarized component.

Alternatively, quadrature phasing may also be provided by passive means, e.g. using delay lines instead of or together with quadrifilar 4-phased antenna feeders. Purely passive quadrature phasing may be provided by three delay lines with a delay line of 90°, a delay line of 180° and a delay line of 270° for three of the four L1-antennas (one of the four L1-antennas does not require a delay line in this case), and with a delay line of 90°, a delay line of 180° and a delay line of 270° for three of the four L2/L5-antennas (one of the four L2/L5-antennas does not require a delay line in this case). The delays are applied to received GNSS signals in the L1 frequency band and in the L2/L5 frequency band.

In a further embodiment of the GNSS antenna system, the first quadrifilar 4-phased antenna feeder and/or the second quadrifilar 4-phased antenna feeder are configured to enable right-handed circular polarization (RHCP) or left-handed circular polarization (LHCP) of the four L1-antennas and/or the four L2/L5-antennas respectively.

Quadrature phasing as provided by the first and second quadrifilar 4-phased antenna feeder may be used for providing an RHCP GNSS antenna system. Optimizing the GNSS antenna system for detecting RHCP GNSS signals may help minimize inaccuracies due to multipath GNSS signal reception. A reflected GNSS signal may e.g. change from an RHCP signal to an LHCP signal: a system optimized for RHCP detection and for suppressing LHCP signals may detect direct path GNSS signals and strongly dampen reflected LHCP signals.

In a further embodiment of the GNSS antenna system, each antenna of the four L1-antennas has an average distance to its respective ground plane, the average distance in particular being between the intermediate point and the ground plane or being an actual average in distance between antenna and ground plane along the antenna, and the respective ground plane is in particular embodied as the common ground plane, wherein the average distance of at least one of the four L1-antennas differs from the average distance of the remaining L1-antennas. In this embodiment, at least one of the four L1-antennas is 1) tuned, in particular by adjusting a distance between the intermediate point and the grounded end of the at least one tuned L1-antenna and/or by adjusting the length of the antenna of the tuned L1-antenna, and/or 2) phased in addition to the phase provided to the tuned L1-antenna by the first quadrifilar 4-phased antenna feeder, wherein the additional phasing is in particular provided by a delay line. Tuning and additional phasing is done in such a way as to compensate influences on radiation properties of the GNSS antenna system in the L1 frequency band due to the at least one bent L1-antenna and due to the difference in average distance between at least one of the four L1-antennas and the remaining L1-antennas.

Each antenna of the four L1-antennas is separated from its respective ground plane, the antennas only being connected at their grounded ends to their respective ground planes.

Each antenna therefore has a distance to its respective ground plane, which distance may be variable along the antenna, e.g. due to the antenna being bent. An average distance may be defined, e.g. being embodied as an actual average of distance between antenna and ground plane evaluated along the antenna, or e.g. being embodied as distance between intermediate point and ground plane. Two L1-antennas may therefore have differing average distances if their antennas are bent differently. Each of the four L1-antennas has its own average distance between its antenna and its ground plane, and at least one of the four L1-antennas has an average distance which differs from the average distance of the remaining L1-antennas, e.g. due to being bent differently. All four L1-antennas may also have average distances with each average distance differing from the other average distances, e.g. due to each antenna being bent differently and/or generally due to different heights of the antennas above their respective ground planes.

Having L1-antennas with different average distances in the GNSS antenna system has in general ramifications on radiation properties of the GNSS antenna system. The height of an antenna above the ground plane for inverted F-antennas influences the resonance frequency of the inverted F-antenna. Variable height of an antenna above the ground plane, e.g. due to bending of the antenna, further changes and complicates resonance behavior of the inverted F-antenna. Having L1-antennas with slightly different resonance frequencies in the GNSS antenna system furthermore affects phasing of the entire system as phase changes rapidly around resonance frequencies.

At least one L1-antenna may therefore be tuned and/or additionally phased, wherein additional phasing is done in addition to and on top of quadrature phasing e.g. provided by the first quadrifilar 4-phased antenna feeder, wherein tuning and/or additional phasing may be done in order to adjust radiation behavior of the GNSS antenna system. The at least one L1-antenna which may be tuned and/or additionally phased may differ from the at least one L1-antenna whose average distance differs from the average distances of the remaining L1-antennas. Tuning may be done by adjusting the length of an antenna or by moving the intermediate point at which the feed contacts an antenna, and additional phasing may be provided by additional delay lines. Tuning may be done in order to adjust the resonance frequency of the at least one tuned L1-antenna, e.g. in order to align it with the resonance frequencies of the remaining L1-antennas.

In a simplified case with only two L1-antennas at different average heights with respect to a common ground plane, additional phasing may be done as follows: the L1-antenna with greater average distance may be additionally delayed and thereby additionally phased in order to adjust arrival of impinging electromagnetic radiation at the two L1-antennas. In the case with four L1-antennas and using similar additional phasing principles as described in the case of two L1-antennas, careful additional phasing and tuning of at least one of the four L1-antennas may help in achieving good circular polarization of the GNSS antenna system even in case of differing average distances of the four L1-antennas and with bent antennas. Such a GNSS antenna system may be both compact and have good radiation properties.

If at least one L1-antenna is both tuned and additionally phased, tuning and additional phasing may be done jointly. As tuning the at least one L1-antenna may influence the phase of the GNSS antenna system, potential phase changes due to tuning may be compensated by the additional phasing—the additional phasing may therefore be used for compensating phase changes due to tuning and for compensating differing average distances between L1-antennas or radiation influences due to bent antennas. The required amount of tuning and additional phasing may be highly dependent on how strongly antennas are bent and on how much average distances between the L1-antennas vary.

In a further embodiment of the GNSS antenna system, each antenna of the four L2/L5-antennas has an average distance to its respective ground plane, the average distance in particular being between the intermediate point and the ground plane or being an actual average in distance between antenna and ground plane along the antenna, and the respective ground plane is in particular embodied as the common ground plane, wherein the average distance of at least one of the four L2/L5-antennas differs from the average distance of the remaining L2/L5-antennas. In this embodiment, at least one of the four L2/L5-antennas is 1) tuned, in particular by adjusting a distance between the intermediate point and the grounded end of the at least one tuned L2/L5-antenna and/or by adjusting the length of the antenna of the tuned L2/L5-antenna, and/or 2) phased in addition to the phase provided to the tuned L2/L5-antenna by the second quadrifilar 4-phased antenna feeder, wherein the additional phasing is in particular provided by a delay line. Tuning and additional phasing is done in such a way as to compensate influences on radiation properties of the GNSS antenna system in the L2/L5 frequency band due to the at least one bent L2/L5-antenna and due to the difference in average distance between at least one of the four L2/L5-antennas and the remaining L2/L5-antennas.

Each antenna of the four L2/L5-antennas is separated from its respective ground plane, the antennas only being connected at their grounded ends to their respective ground planes. Each antenna therefore has a distance to its respective ground plane, which distance may be variable along the antenna, e.g. due to the antenna being bent. An average distance may be defined, e.g. being embodied as an actual average of distance between antenna and ground plane evaluated along the antenna, or e.g. being embodied as distance between intermediate point and ground plane. Two L2/L5-antennas may therefore have differing average distances if their antennas are bent differently. Each of the four L2/L5-antennas has its own average distance between its antenna and its ground plane, and at least one of the four L2/L5-antennas has an average distance which differs from the average distance of the remaining L2/L5-antennas, e.g. due to being bent differently. All four L2/L5-antennas may also have average distances with each average distance differing from the other average distances, e.g. due to each antenna being bent differently and/or generally due to different heights of the antennas above their respective ground planes.

Having L2/L5-antennas with different average distances in the GNSS antenna system has in general ramifications on radiation properties of the GNSS antenna system. The height of an antenna above the ground plane for inverted F-antennas influences the resonance frequency of the inverted F-antenna. Variable height of an antenna above the ground plane, e.g. due to bending of the antenna, further changes and complicates resonance behavior of the inverted F-antenna. Having L2/L5-antennas with slightly different resonance frequencies in the GNSS antenna system furthermore affects phasing of the entire system as phase changes rapidly around resonance frequencies.

At least one L2/L5-antenna may therefore be tuned and/or additionally phased, wherein additional phasing is done in addition to and on top of quadrature phasing e.g. provided by the second quadrifilar 4-phased antenna feeder, wherein tuning and/or additional phasing may be done in order to adjust radiation behavior of the GNSS antenna system. The at least one L2/L5-antenna which may be tuned and/or additionally phased may differ from the at least one L2/L5-antenna whose average distance differs from the average distances of the remaining L2/L5-antennas. Tuning may be done by adjusting the length of an antenna or by moving the intermediate point at which the feed contacts an antenna, and additional phasing may be provided by additional delay lines. Tuning may be done in order to adjust the resonance frequency of the at least one tuned L2/L5-antenna, e.g. in order to align it with the resonance frequencies of the remaining L2/L5-antennas.

In a simplified case with only two L2/L5-antennas at different average heights with respect to a common ground plane, additional phasing may be done as follows: the L2/L5-antenna with greater average distance may be additionally delayed and thereby additionally phased in order to adjust arrival of impinging electromagnetic radiation at the two L2/L5-antennas. In the case with four L2/L5-antennas and using similar additional phasing principles as described in the case of two L2/L5-antennas, careful additional phasing and tuning of at least one of the four L2/L5-antennas may help in achieving good circular polarization of the GNSS antenna system even in case of differing average distances of the four L2/L5-antennas and with bent antennas. Such a GNSS antenna system may be both compact and have good radiation properties.

If at least one L2/L5-antenna is both tuned and additionally phased, tuning and additional phasing may be done jointly. As tuning the at least one L2/L5-antenna may influence the phase of the GNSS antenna system, potential phase changes due to tuning may be compensated by the additional phasing—the additional phasing may therefore be used for compensating phase changes due to tuning and for compensating differing average distances between L2/L5-antennas or radiation influences due to bent antennas. The required amount of tuning and additional phasing may be highly dependent on how strongly antennas are bent and on how much average distances between the L2/L5-antennas vary.

In a further embodiment of the GNSS antenna system, the feed signals fed to the four L1-antennas each have a same first power, and/or the feed signals fed to the four L2/L5-antennas each have a same second power.

The GNSS antenna system may be connected to a low noise amplifier which is preferentially positioned closely to the inverted F-antennas of the GNSS antenna system so as to minimize losses occurring on transmission lines.

The disclosure also relates to a second GNSS antenna system for receiving GNSS signals, in particular GPS, GLONASS, BDS or Galileo, comprising 1) at least one inverted F-antenna configured to receive GNSS signals in at least one GNSS frequency band, wherein each inverted F-antenna comprises an antenna, a ground plane and a feed, wherein the feed is connected at an intermediate point to the antenna and wherein the antenna is connected at a grounded end to the ground plane, each antenna having an average distance to its ground plane, the average distance in particular being between the intermediate point and the ground plane. The second GNSS antenna system comprises four inverted F-antennas, wherein the four inverted F-antennas have a common ground plane, and wherein at least one of the four inverted F-antennas has an average distance to the common ground plane which differs from the average distances to the common ground plane of the remaining inverted F-antennas, and wherein at least one of the four inverted F-antennas has an antenna which is bent, and wherein at least one of the four inverted F-antennas is tuned and phased to compensate influences on radiation properties of the second GNSS antenna system in the at least one GNSS frequency band due to the at least one bent antenna and due to the difference in average distance between at least one of the four inverted F-antennas and the remaining inverted F-antennas.

The disclosure also relates to an unmanned aerial vehicle (UAV) for flying in a physical environment, comprising 1) a body extending along an axis from a front end to a back end having a housing, 2) a first mounting structure attached to the body and extending away from the body in a direction to a left side of the axis, 3) a second mounting structure attached to the body and extending away from the body in a direction to a right side of the axis being an opposite direction to the direction to the left side, 4) four propulsion units, in particular rotor assemblies, two of which are mounted to the first mounting structure and two of which are mounted to the second mounting structure, 5) a directional distance measuring module including a measuring field of view with a main view direction, within which measuring field of view directions and distances to surfaces in the physical environment are measurable by directionally emitting distance measurement radiation into the field of view, and including a detector unit for detecting distance measurement radiation reflected from a surface and a distance measurement radiation source, and 6) a GNSS antenna system for receiving GNSS signals. A part of the housing of the UAV is embodied as carbon fiber housing, wherein on the upper side of the UAV the carbon fiber housing surrounds a part of the housing embodied as fiber glass housing, wherein the GNSS antenna system is arranged below the fiber glass housing.

Fiber glass is an electromagnetically transparent material. Placing the GNSS antenna system below the fiber glass housing therefore ensures that electromagnetic radiation—by which GNSS navigation signals are transported—can reach the GNSS antenna system without being strongly damped by the housing of the UAV. Since GNSS signals typically reach the UAV from above, having fiber glass housing on the upper side of the housing ensures that direct GNSS signals can reach the GNSS antenna system. GNSS signals which reach the GNSS antenna system indirectly, e.g. by way of multipath reflection at reflective outside surfaces, may at least partly be damped by the carbon fiber housing. As such indirect GNSS signals may be detrimental for navigation purposes, the placement of the GNSS antenna system in the UAV may allow for higher navigation accuracy.

In an embodiment of the UAV, the UAV comprises a curved surface made of plastic, and the GNSS antenna system comprises at least one inverted F-antenna which comprises an antenna, which antenna is arranged on the curved surface, which curved surface is physically separate from the fiber glass housing and arranged below the fiber glass housing.

In a further embodiment of the UAV, the fiber glass housing and the curved surface are shaped in a substantially similar manner, wherein the fiber glass housing tightly follows the curved surface, in particular with only a small gap between the curved surface and the fiber glass housing.

The GNSS antenna system may therefore be integrated into the UAV in a space-saving manner. The GNSS antenna system is positioned in the available space of the UAV.

In a further embodiment of the UAV, the GNSS antenna system comprises eight inverted F-antennas, and the UAV comprises a first quadrifilar 4-phased antenna feeder, a second quadrifilar 4-phased antenna feeder and a printed circuit board, wherein the eight antennas of the eight inverted F-antennas are arranged on the curved surface, and on which curved surface the first quadrifilar 4-phased antenna feeder is mounted. The eight inverted F-antennas comprise a common ground plane below the curved surface, which common ground plane is arranged on the printed circuit board, wherein the second quadrifilar 4-phased antenna feeder is mounted on the printed circuit board.

Off-the-shelf GNSS antennas may have good radiation properties but may not be easily integrated in a UAV with tight space restrictions. Using additional phasing and tuning of individual inverted F-antennas, a GNSS antenna system may be provided which is both compact and has good radiation properties. Such a GNSS antenna system may have relaxed arrangement requirements compared to GNSS antenna systems known in the state of the art. The antennas of the GNSS antennas may be bent, thereby utilizing available space efficiently, and tuning and additional phasing may be used for obtaining good overall radiation properties.

BRIEF DESCRIPTION OF THE DRAWINGS

Aspects are described below in more detail purely by way of example with the aid of concrete exemplary embodiments illustrated schematically in the drawings, further advantages also being examined. Identical elements are labelled with the same reference numerals in the figures. In detail.

DETAILED DESCRIPTION

Figure 1:
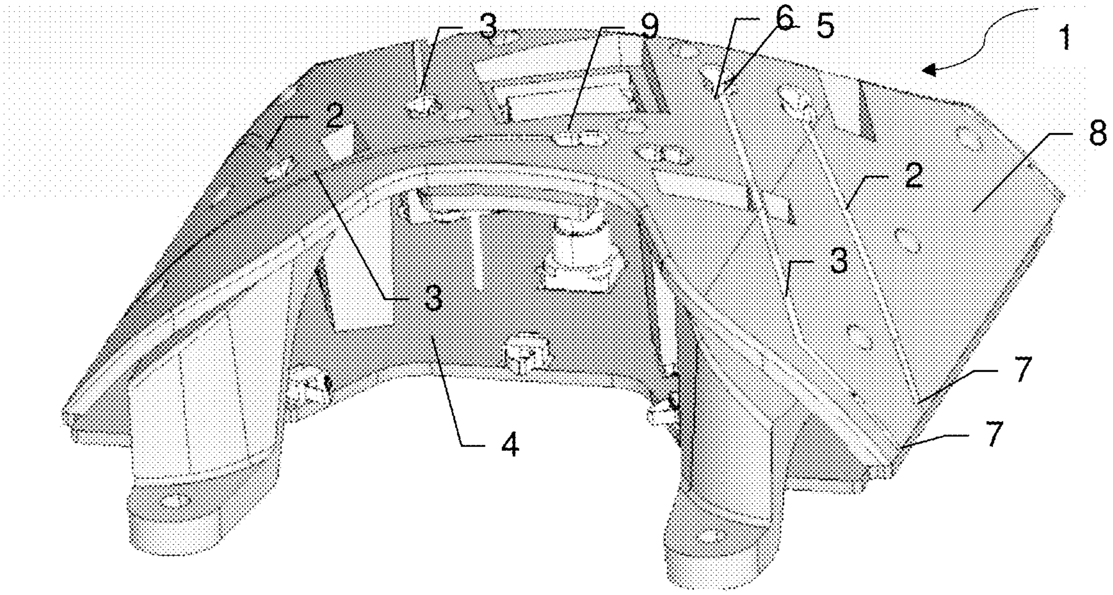
FIG. 1 shows an illustrative depiction of an embodiment of a GNSS antenna system.

FIG. 1 shows an illustrative depiction of an embodiment of a GNSS antenna system 1. The GNSS antenna system 1 comprises inverted F-antennas for capturing GNSS signals in the L1 and in the L2/L5 frequency band. The inverted F-antennas are arranged on a curved surface 8. In the embodiment of FIG. 1, eight inverted F-antennas are present (only five of the eight inverted F-antennas are at least partly visible in FIG. 1), wherein four inverted F-antennas are configured to receive GNSS signals in the L1 frequency band and four inverted F-antennas are configured to receive GNSS signals in the L2/L5 frequency band. The eight inverted F-antennas jointly share a common ground plane 4. Each antenna 2 configured for receiving signals in the L1 frequency band has a grounded end 6 at which it is connected to the common ground plane 4, an intermediate point 5 at which a feed signal is provided, and an antenna end point 7 at which the antenna 2 ends. Equivalently, each antenna 3 configured for receiving signals in the L2/L5 frequency band also has a grounded end 6 at which it is connected to the common ground plane 4, an intermediate point 5 at which a feed signal is provided, and an antenna end point 7 at which the antenna 3 ends. The antennas in FIG. 1 are bent as they are arranged on a curved surface 8.

Each of the inverted F-antennas in FIG. 1 has a direction defined between its grounded end 6 and its antenna end point 7. The four antennas 3 on the curved surface 8 (only three are visible in FIG. 1) configured to receive L2/L5 GNSS signals are direction wise arranged as follows: a first L2/L5 antenna points in a first direction, a second L2/L5 antenna has a second direction which is roughly orthogonal to the first direction, a third L2/L5 antenna has a third direction which is roughly orthogonal to the second direction and roughly antiparallel to the first direction, and a fourth L2/L5 antenna has a fourth direction which is roughly orthogonal to the third direction and roughly antiparallel to the second direction. Each of the four antennas 2 configured to receive L1 GNSS signals has a corresponding L2/L5 antenna, wherein the direction of each of the four antennas 2 configured to receive L1 GNSS signals roughly corresponds to the direction of the corresponding L2/L5 antenna.

The curved surface 8 has a mounting structure 9 in which a quadrifilar 4-phased antenna feeder can be mounted, which quadrifilar 4-phased antenna feeder is configured to provide phasing to the four inverted F-antennas in the L2/L5 frequency band.

Figure 2:
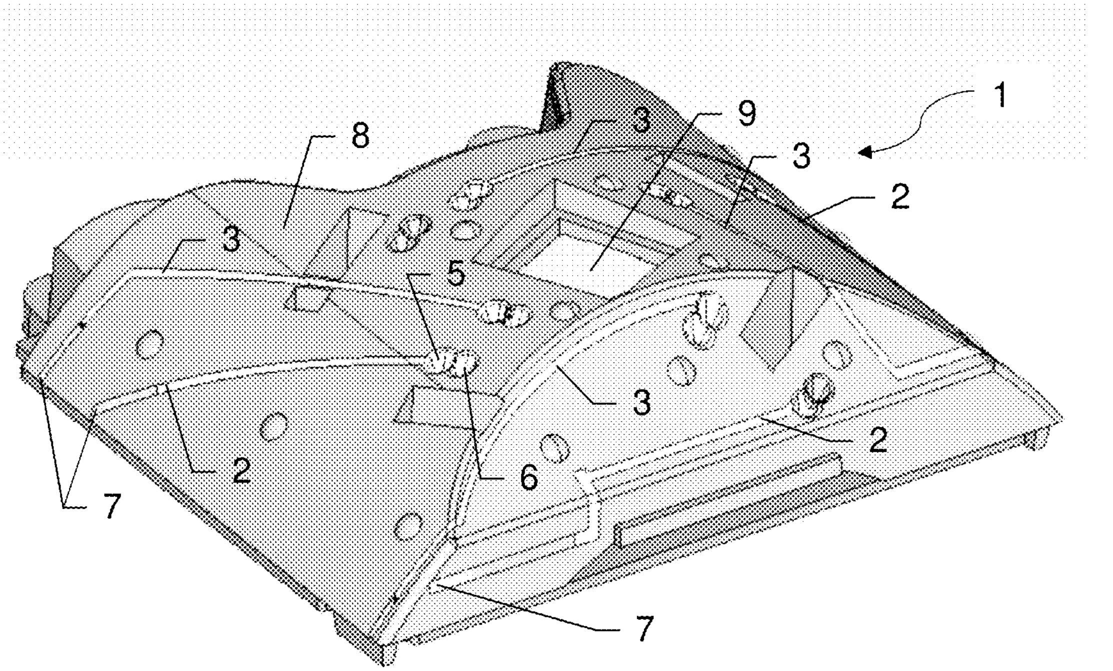
FIG. 2 shows another illustrative depiction of an embodiment of a GNSS antenna system from a different perspective.

FIG. 2 shows an illustrative depiction of an embodiment of a GNSS antenna system 1, which embodiment of FIG. 2 corresponds to the embodiment of FIG. 1 shown from a different perspective, specifically from behind. In the perspective of FIG. 2, further antennas 2,3 are visible which are not visible in the perspective of FIG. 1.

Figure 3:
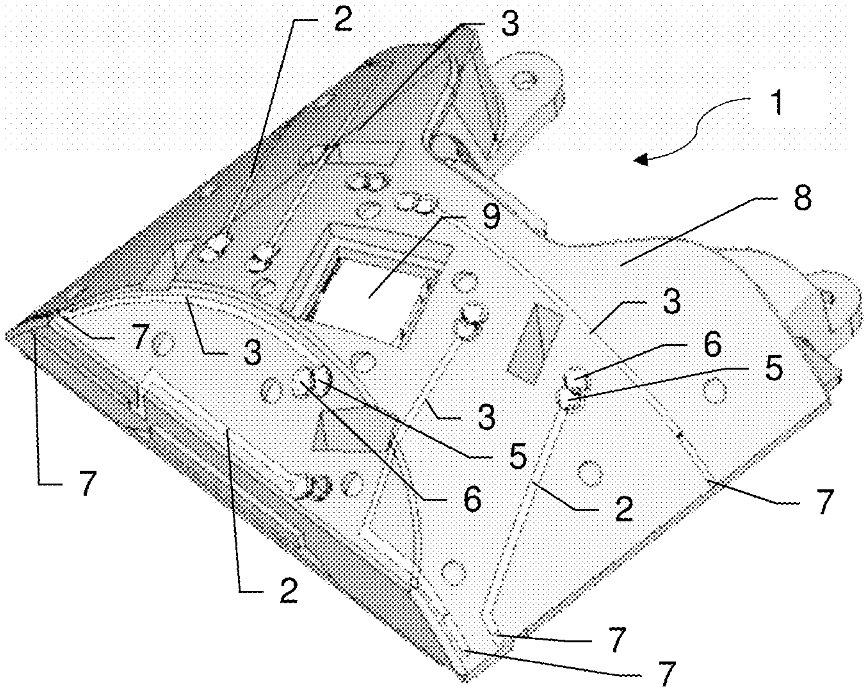
FIG. 3 shows a further illustrative depiction of an embodiment of a GNSS antenna system from another perspective.

FIG. 3 shows an illustrative depiction of an embodiment of a GNSS antenna system 1, which embodiment of FIG. 3 corresponds to the embodiment of FIGS. 1 and 2, wherein the embodiment is shown from above in FIG. 3.

Figure 4:
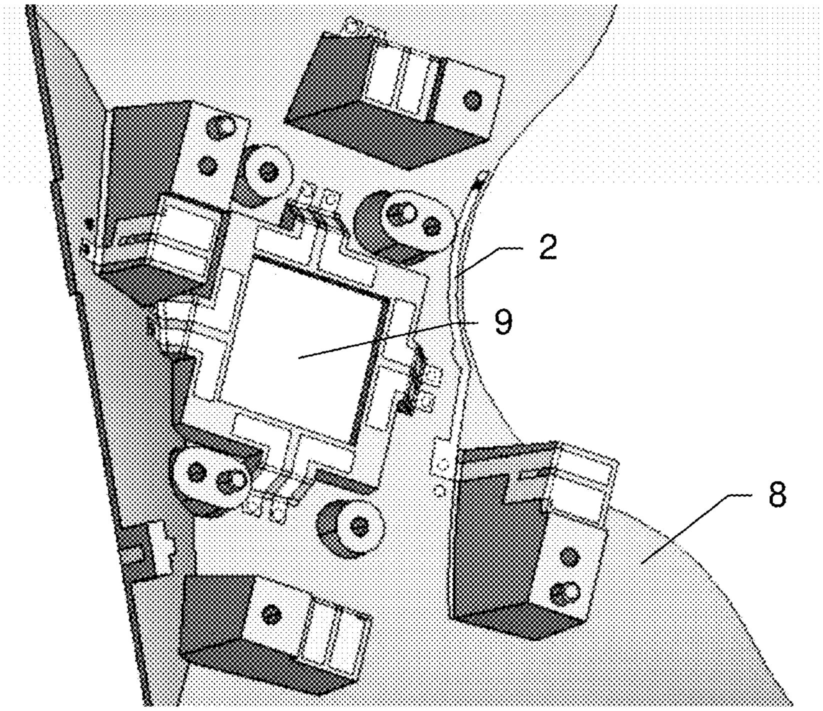
FIG. 4 shows an illustrative depiction of parts of the inside of an embodiment of a GNSS antenna system.

FIG. 4 shows an illustrative depiction of a part of the inside of an embodiment of a GNSS antenna system 1. FIG. 4 depicts parts of the curved surface 8 of FIGS. 1 to 3 from within the GNSS antenna system 1, showing the mounting structure 9 embedded in the curved surface 8. One antenna 2 configured to receive L1 GNSS signals is arranged on the inside of the GNSS antenna system 1, i.e. on a different side of the curved surface 8 compared to the other antennas 2,3.

Figure 5:
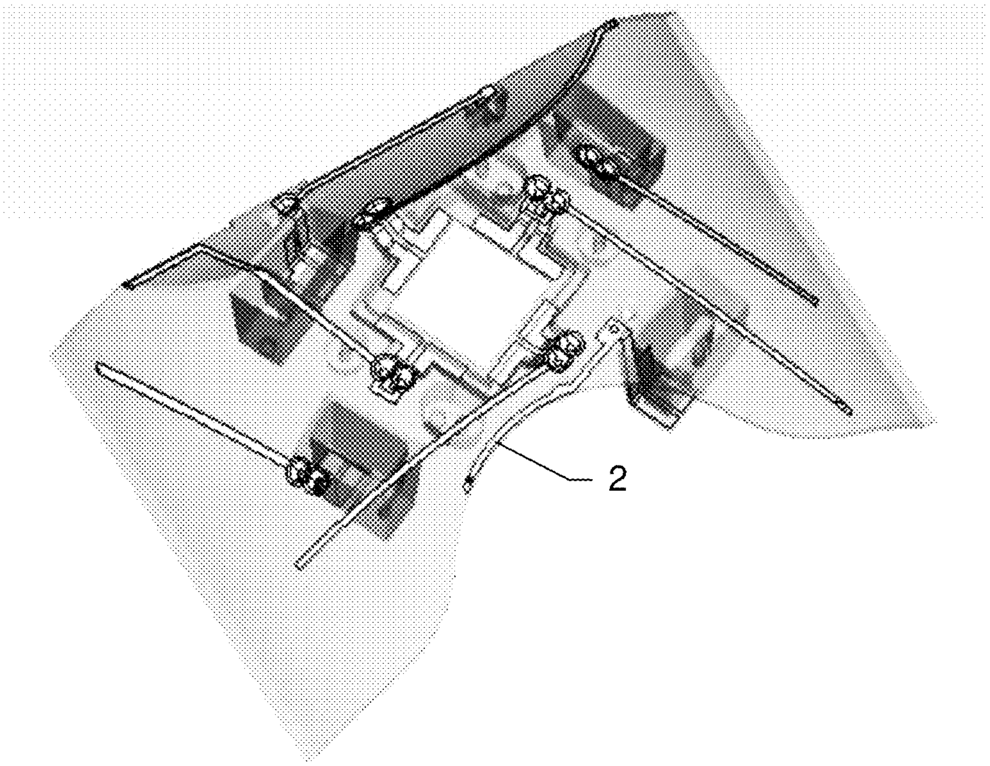
FIG. 5 shows an illustrative depiction of an embodiment of a GNSS antenna system with a transparent curved surface for visualization purposes.

FIG. 5 shows an illustrative depiction of an embodiment of a GNSS antenna system 1, wherein the embodiment of FIG. 5 corresponds to the embodiments of FIGS. 1 to 4. For visualization purposes, the cover surface 8 in FIG. 5 is made transparent. The antenna 2 arranged on the inside of the GNSS antenna system 1 is therefore visible in FIG. 5.

Figure 6:
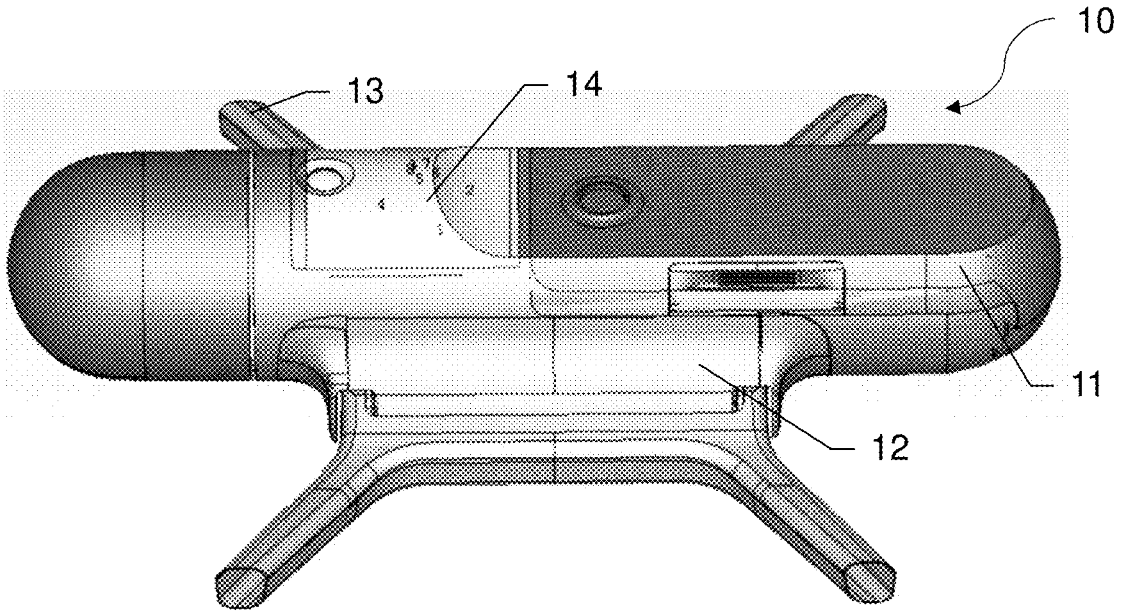
FIG. 6 shows an illustrative depiction of an embodiment of an unmanned aerial vehicle (UAV).

FIG. 6 shows an illustrative depiction of an unmanned aerial vehicle (UAV) 10. The UAV comprises a body 11 extending along an axis from a front end to a back end having a housing, a first mounting structure 12 attached to the body and extending away from the body in a direction to a left side of the axis and a second mounting structure 13 attached to the body and extending away from the body in a direction to a right side of the axis being an opposite direction to the direction to the left side. Four propulsion units, in particular rotor assemblies, which are not shown in FIG. 6 may be mounted to the body 11, two of which may be mounted to the first mounting structure 12 and two of which may be mounted to the second mounting structure 13.

A part of the housing of the UAV 10 is embodied as carbon fiber housing, wherein on the upper side of the UAV the carbon fiber housing surrounds a part of the housing embodied as fiber glass housing 14, wherein the GNSS antenna system is arranged below the fiber glass housing 14. The numbers shown in FIG. 6 in the area of the fiber glass housing indicate a rough location of eight antennas for receiving GNSS signals in the L1 and L2/L5 frequency band.

A directional distance measuring module including a measuring field of view with a main view direction, within which measuring field of view directions and distances to surfaces in the physical environment are measurable by directionally emitting distance measurement radiation into the field of view, and a detector unit for detecting distance measurement radiation reflected from a surface, and a distance measurement radiation source are part of the UAV 10. These components may be arranged in the front of the UAV 10.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A GNSS antenna system for receiving GNSS signals, comprising:

at least one inverted F-antenna configured to receive GNSS signals in the L1 frequency band (L1-antenna), and at least one inverted F-antenna configured to receive GNSS signals in the L2/L5 frequency band (L2/L5-antenna), wherein each inverted F-antenna comprises an antenna having an antenna end point and a grounded end, a ground plane and a feed, wherein the feed is connected at an intermediate point to the antenna and wherein the antenna is connected at the grounded end to the ground plane, each inverted F-antenna having a direction defined between the grounded end and the antenna end point, wherein the GNSS antenna system comprises four L1-antennas and four L2/L5-antennas, wherein:

a first L1-antenna of the four L1-antennas is oriented in a first direction, a second L1-antenna of the four L1-antennas is oriented in a second direction substantially orthogonal to the first direction, a third L1-antenna of the four L1-antennas is oriented in a third direction substantially orthogonal to the second direction and substantially antiparallel to the first direction, and a fourth antenna of the four L1-antennas is oriented in a fourth direction substantially orthogonal to the third direction and substantially antiparallel to the second direction, wherein each L2/L5-antenna of the four L2/L5-antennas has a corresponding L1-antenna and wherein the direction of each L2/L5-antenna substantially corresponds to the direction of the corresponding L1-antenna, wherein each antenna of the four L1-antennas has an average distance to its respective ground plane, the average distance in particular being between the intermediate point and the ground plane or being an actual average in distance between antenna and ground plane along the antenna, and wherein the respective ground plane is in particular embodied as the common ground plane, wherein the average distance of at least one of the four L1-antennas differs from the average distance of the remaining L1-antennas, and in that at least one of the four L1-antennas is:

tuned, in particular by adjusting a distance between the intermediate point and the grounded end of the at least one tuned L1-antenna and/or by adjusting the length of the antenna of the tuned L1-antenna, and/or phased in addition to the phase provided to the tuned L1-antenna by the first quadrifilar 4-phased antenna feeder, wherein the additional phasing is in particular provided by a delay line, wherein tuning and additional phasing is done in such a way as to compensate influences on radiation properties of the GNSS antenna system in the L1 frequency band due to the at least one bent L1-antenna and due to the difference in average distance between at least one of the four L1-antennas and the remaining L1-antennas.

2. The GNSS antenna system according to claim 1, wherein at least one of the four L1-antennas and/or at least one of the four L2/L5-antennas comprises an antenna which is bent.

3. The GNSS antenna system according to claim 1, wherein the four L1-antennas and the four L2/L5-antennas share a common ground plane.

4. The GNSS antenna system according to claim 1, wherein:

the antennas of the four L1-antennas are configured to be fed by a first quadrifilar 4-phased antenna feeder (L1-feeder) using the respective feed, and the antennas of the four L2/L5-antennas are configured to be fed by a second quadrifilar 4-phased antenna feeder (L2/L5-feeder) using the respective feed, wherein a phase of a feed signal provided by the respective feed differs by 90 degrees between consecutive L1-antennas and by 90 degrees between consecutive L2/L5-antennas.

5. The GNSS antenna system according to claim 4, wherein the first quadrifilar 4-phased antenna feeder and/or the second quadrifilar 4-phased antenna feeder are configured to enable right-handed circular polarization (RHCP) or left-handed circular polarization (LHCP) of the four L1-antennas and/or the four L2/L5-antennas respectively.

6. The GNSS antenna system according to claim 1, wherein the feed signals fed to the four L1-antennas each have a same first power, and/or the feed signals fed to the four L2/L5-antennas each have a same second power.

7. A GNSS antenna system for receiving GNSS signals, comprising:

at least one inverted F-antenna configured to receive GNSS signals in the L1 frequency band (L1-antenna), and at least one inverted F-antenna configured to receive GNSS signals in the L2/L5 frequency band (L2/L5-antenna), wherein each inverted F-antenna comprises an antenna having an antenna end point and a grounded end, a ground plane and a feed, wherein the feed is connected at an intermediate point to the antenna and wherein the antenna is connected at the grounded end to the ground plane, each inverted F-antenna having a direction defined between the grounded end and the antenna end point, wherein the GNSS antenna system comprises four L1-antennas and four L2/L5-antennas, wherein:

a first L1-antenna of the four L1-antennas is oriented in a first direction, a second L1-antenna of the four L1-antennas is oriented in a second direction substantially orthogonal to the first direction, a third L1-antenna of the four L1-antennas is oriented in a third direction substantially orthogonal to the second direction and substantially antiparallel to the first direction, and a fourth antenna of the four L1-antennas is oriented in a fourth direction substantially orthogonal to the third direction and substantially antiparallel to the second direction, wherein each L2/L5-antenna of the four L2/L5-antennas has a corresponding L1-antenna and wherein the direction of each L2/L5-antenna substantially corresponds to the direction of the corresponding L1-antenna, wherein each antenna of the four L2/L5-antennas has an average distance to its respective ground plane, the average distance in particular being between the intermediate point and the ground plane or being an actual average in distance between antenna and ground plane along the antenna, and wherein the respective ground plane is in particular embodied as the common ground plane, wherein the average distance of at least one of the four L2/L5-antennas differs from the average distance of the remaining L2/L5-antennas, and in that at least one of the four L2/L5-antennas is:

tuned, in particular by adjusting a distance between the intermediate point and the grounded end of the at least one tuned L2/L5-antenna and/or by adjusting the length of the antenna of the tuned L2/L5-antenna, and/or phased in addition to the phase provided to the tuned L2/L5-antenna by the second quadrifilar 4-phased antenna feeder, wherein the additional phasing is in particular provided by a delay line, wherein tuning and additional phasing is done in such a way as to compensate influences on radiation properties of the GNSS antenna system in the L2/L5 frequency band due to the at least one bent L2/L5-antenna and due to the difference in average distance between at least one of the four L2/L5-antennas and the remaining L2/L5-antennas.

8. A GNSS antenna system for receiving GNSS signals, comprising:

at least one inverted F-antenna configured to receive GNSS signals in at least one GNSS frequency band, wherein each inverted F-antenna comprises an antenna, a ground plane and a feed, wherein the feed is connected at an intermediate point to the antenna and wherein the antenna is connected at a grounded end to the ground plane, each antenna having an average distance to its ground plane, the average distance in particular being between the intermediate point and the ground plane, wherein the GNSS antenna system comprises four inverted F-antennas, wherein the four inverted F-antennas have a common ground plane, and wherein at least one of the four inverted F-antennas has an average distance to the common ground plane which differs from the average distances to the common ground plane of the remaining inverted F-antennas, and wherein at least one of the four inverted F-antennas has an antenna which is bent, and wherein at least one of the four inverted F-antennas is tuned and phased to compensate influences on radiation properties of the GNSS antenna system in the at least one GNSS frequency band due to the at least one bent antenna and due to the difference in average distance between at least one of the four inverted F-antennas and the remaining inverted F-antennas.

9. An unmanned aerial vehicle (UAV) for flying in a physical environment, comprising:

a body extending along an axis from a front end to a back end having a housing, a first mounting structure attached to the body and extending away from the body in a direction to a left side of the axis, a second mounting structure attached to the body and extending away from the body in a direction to a right side of the axis being an opposite direction to the direction to the left side, four propulsion units, in particular rotor assemblies, two of which are mounted to the first mounting structure and two of which are mounted to the second mounting structure, a directional distance measuring module including:

a measuring field of view with a main view direction, within which measuring field of view directions and distances to surfaces in the physical environment are measurable by directionally emitting distance measurement radiation into the field of view, a detector unit for detecting distance measurement radiation reflected from a surface, and a distance measurement radiation source, and the GNSS antenna system of claim 1 for receiving GNSS signals, wherein a part of the housing of the UAV is embodied as carbon fiber housing, wherein on the upper side of the UAV the carbon fiber housing surrounds a part of the housing embodied as fiber glass housing, wherein the GNSS antenna system is arranged below the fiber glass housing.

10. The unmanned aerial vehicle (UAV) according to claim 9, wherein the UAV comprises a curved surface made of plastic, and the GNSS antenna system comprises at least one inverted F-antenna which comprises an antenna, which antenna is arranged on the curved surface, which curved surface is physically separate from the fiber glass housing and arranged below the fiber glass housing.

11. The unmanned aerial vehicle (UAV) according to claim 10, wherein the fiber glass housing and the curved surface are shaped in a substantially similar manner, wherein the fiber glass housing tightly follows the curved surface, in particular with only a small gap between the curved surface and the fiber glass housing.

12. The unmanned aerial vehicle (UAV) according to claim 11, wherein the GNSS antenna system comprises eight inverted F-antennas, and the UAV comprises a first quadrifilar 4-phased antenna feeder, a second quadrifilar 4-phased antenna feeder and a printed circuit board, wherein the eight antennas of the eight inverted F-antennas are arranged on the curved surface, and on which curved surface the first quadrifilar 4-phased antenna feeder is mounted, and wherein the eight inverted F-antennas comprise a common ground plane below the curved surface, which common ground plane is arranged on the printed circuit board, wherein the second quadrifilar 4-phased antenna feeder is mounted on the printed circuit board.

13. The unmanned aerial vehicle (UAV) according to claim 10, wherein the GNSS antenna system comprises eight inverted F-antennas, and the UAV comprises a first quadrifilar 4-phased antenna feeder, a second quadrifilar 4-phased antenna feeder and a printed circuit board, wherein the eight antennas of the eight inverted F-antennas are arranged on the curved surface, and on which curved surface the first quadrifilar 4-phased antenna feeder is mounted, and wherein the eight inverted F-antennas comprise a common ground plane below the curved surface, which common ground plane is arranged on the printed circuit board, wherein the second quadrifilar 4-phased antenna feeder is mounted on the printed circuit board.

14. An unmanned aerial vehicle (UAV) for flying in a physical environment, comprising:

a body extending along an axis from a front end to a back end having a housing, a first mounting structure attached to the body and extending away from the body in a direction to a left side of the axis, a second mounting structure attached to the body and extending away from the body in a direction to a right side of the axis being an opposite direction to the direction to the left side, four propulsion units, in particular rotor assemblies, two of which are mounted to the first mounting structure and two of which are mounted to the second mounting structure, a directional distance measuring module including:

a measuring field of view with a main view direction, within which measuring field of view directions and distances to surfaces in the physical environment are measurable by directionally emitting distance measurement radiation into the field of view, a detector unit for detecting distance measurement radiation reflected from a surface, and a distance measurement radiation source, and the GNSS antenna system of claim 9 for receiving GNSS signals, wherein a part of the housing of the UAV is embodied as carbon fiber housing, wherein on the upper side of the UAV the carbon fiber housing surrounds a part of the housing embodied as fiber glass housing, wherein the GNSS antenna system is arranged below the fiber glass housing.

15. The unmanned aerial vehicle (UAV) according to claim 14, wherein the UAV comprises a curved surface made of plastic, and the GNSS antenna system comprises at least one inverted F-antenna which comprises an antenna, which antenna is arranged on the curved surface, which curved surface is physically separate from the fiber glass housing and arranged below the fiber glass housing.

16. The unmanned aerial vehicle (UAV) according to claim 15, wherein the fiber glass housing and the curved surface are shaped in a substantially similar manner, wherein the fiber glass housing tightly follows the curved surface, in particular with only a small gap between the curved surface and the fiber glass housing.

17. The unmanned aerial vehicle (UAV) according to claim 16, wherein the GNSS antenna system comprises eight inverted F-antennas, and the UAV comprises a first quadrifilar 4-phased antenna feeder, a second quadrifilar 4-phased antenna feeder and a printed circuit board, wherein the eight antennas of the eight inverted F-antennas are arranged on the curved surface, and on which curved surface the first quadrifilar 4-phased antenna feeder is mounted, and wherein the eight inverted F-antennas comprise a common ground plane below the curved surface, which common ground plane is arranged on the printed circuit board, wherein the second quadrifilar 4-phased antenna feeder is mounted on the printed circuit board.

18. The unmanned aerial vehicle (UAV) according to claim 15, wherein the GNSS antenna system comprises eight inverted F-antennas, and the UAV comprises a first quadrifilar 4-phased antenna feeder, a second quadrifilar 4-phased antenna feeder and a printed circuit board, wherein the eight antennas of the eight inverted F-antennas are arranged on the curved surface, and on which curved surface the first quadrifilar 4-phased antenna feeder is mounted, and wherein the eight inverted F-antennas comprise a common ground plane below the curved surface, which common ground plane is arranged on the printed circuit board, wherein the second quadrifilar 4-phased antenna feeder is mounted on the printed circuit board.

* * * * *